United States Patent [19]
Serad

[11] Patent Number: 5,342,854
[45] Date of Patent: Aug. 30, 1994

[54] POLYESTER DISSOLUTION FOR POLYESTER/COTTON BLEND RECYCLE

[75] Inventor: Susan L. Serad, Charlotte, N.C.

[73] Assignee: Hoechst Celanese Corporation, Somerville, N.J.

[21] Appl. No.: 98,556

[22] Filed: Jul. 28, 1993

[51] Int. Cl.⁵ .................. C08J 11/04; C08J 11/28
[52] U.S. Cl. ..................... 521/48; 521/40.5; 521/48.5; 524/34; 528/487
[58] Field of Search ............ 521/48, 48.5, 40.5; 528/487; 524/34

[56] References Cited

U.S. PATENT DOCUMENTS

| | | | |
|---|---|---|---|
| 3,801,273 | 4/1974 | Mays | 8/141 |
| 3,937,671 | 2/1976 | Gruntfest et al. | 521/48 |
| 3,937,675 | 2/1976 | Gruntfest et al. | 521/48 |
| 4,345,039 | 8/1982 | Cowan et al. | 521/48 |

FOREIGN PATENT DOCUMENTS 1548043  7/1979  Fed. Rep. of Germany.

OTHER PUBLICATIONS

"Polyester Fibers from Polyester/Cotton Blends", *Organic and Polymer Waste Reclaiming Encyclopedia*, pp. 328–329.

"Cotton Fibers from Cotton/Synthetic Fiber Blends", *Organic and Polymer Waste Reclaiming Encyclopedia*, pp. 97–98.

"Dimethyl Terephthalate from Polyethylene Terephthalate Waste", *Organic and Polymer Waste Reclaiming Encyclopedia*, pp. 117–122.

*Primary Examiner*—Paul R. Michl
*Assistant Examiner*—Olga Asinovsky
*Attorney, Agent, or Firm*—Philip P. McCann

[57] ABSTRACT

A process is described for recycling polyester and cotton blend fabrics by separating the polyester from the cotton fabric. The novel process to recycle the polyester/cotton blend fabrics includes the steps of (a) providing a polyester and cotton blend fabric; (b) charging said blend into a sulfone solvent; (c) dissolving the polyester in the sulfone solvent; (d) separating the dissolved polyester and sulfone solvent solution from the cotton fabric; (e) filtering the cotton to obtain isolated, cotton fabric.

20 Claims, No Drawings

POLYESTER DISSOLUTION FOR POLYESTER/COTTON BLEND RECYCLE

Field of the Invention

The present invention relates to a process for recycling polyester and cotton blend fabrics in such a way as to separate the polyester from the cotton fabric.

Large volumes of textile wastes are produced annually in the manufacture of clothing and other textile products: A large percentage of the textile waste is accounted for by polyester/cellulosic fabrics such as polyester/cotton and polyester/rayon blends. The reuse of the blended materials is complicated by the fact that there are inherent differences in the physical properties and composition of the two components. Additionally, the fabrics are treated with resinous materials and other finishes such as flame retardants which limit reusability. This makes it nearly impossible to find potential commercial end uses for this material other than rags or cloth scraps which are of little monetary value.

Disposal of such large volumes of solid waste is an increasing problem for the apparel industry. The rising cost, reduction in available space, and concern for the environment are making burning and landfilling the textile waste dwindling options. Therefore, potential methods of recycling polyester/cotton fabric blends have been pursued.

Waste polyester scrap can be recycled for reuse by various processes. It is known that polyesters can be dissolved in solvents and solvent systems such as 1,1,1,3,3,3 -hexafluoropropanol, phenol/tetrachloroethane, or trichloroacetic acid/chloroform. Technical, economic, and environmental considerations of this process limit its applicability. These are among the reasons that solvent systems such as these are only of interest for analytical investigations.

Another method for recovery of polyester scrap is by means of dissolution of the polyester in various solvents, thereafter precipitating and recovering the polyester. A process has been disclosed in U.S. Pat. No. 4,003,880 providing a method whereby dye-stripping, separation, and polyester recovery are combined in such a way as that the dye-stripping phase actually constitutes the first step of the dissolution and separation phase. After the dye-stripping is completed, the fibers remain saturated with a dye-stripping solvent, which can also be used for dissolution of the polyester. The dissolution of the polyester and its subsequent precipitation and separation from the solvent serves to complete the dye removal in addition to the separation and recovery of the polyester.

Alternatively, there are processes which involve degrading the polyester with a lower alkyl alcohol and subsequently recovering the dicarboxylic diester by crystallization and the alcohol from the resulting reaction mixture by distillation.

A process has been disclosed in U.S. Pat. No. 3,801,273 providing a method of recovering waste cellulose fibers from mixtures of waste cellulosic fibers, waste polyester and/or acrylic fibers and synthetic, cross-linked resinous material. The methods therein disclose heating a mixture of the waste cellulosic fibers, waste polyester and/or acrylic fibers and synthetic, cross-linked resin materials within the range of from 212 to 275 degrees Fahrenheit for a period of from ¾ to 5 hours in an aqueous treating solution containing an alkali metal hydroxide and one or more added, normally liquid chemical agents such as ketones, alcohols, lactones, and sulfides which initiate the decomposition or solubilization of the waste polyester and/or acrylic fibers and synthetic, cross-linked resin materials; adding a neutral or alkaline oxidizing agent to the mixture of waste fibers and synthetic, cross-linked resin materials; heating the mixture of waste fibers in synthetic, cross-linked resin materials in the presence of the neutral or alkaline oxidizing agent to complete the decomposition or solubilization of the waste polyester; and the recovery of the waste cellulosic fibers.

Various methods have been described in the prior art for the recovery of polyester from cellulose fibers. U.S. Pat. No. 3,937,671 discloses a process in which textile waste composed of blended polyester and cellulose fibers are subjected to the action of glacial acetic acid and acetic anhydride in the presence of a catalyst under conditions which serve to convert the cellulose component of the waste to cellulose acetate which is separated from the unreacted polyester component in the form of a solution adapted to be used in the manufacture of cellulose derivatives where the polyester is removed in a form which may be garnetted to obtain a staple fiber for reuse.

A process is disclosed in U.S. Pat. No. 3,937,675. In the disclosed process, textile waste formed of blended cellulose and polyester fibers are treated with a mineral acid agent such as sulfuric acid, under conditions which serve to hydrolyze the cellulose and convert it to a form which is readily removed from the polyester fibers while leaving the polyester fibers substantially unaffected. The cellulosic material is recovered in the form of fibrets adapted for use as such or for treatment in producing other cellulosic compounds whereas the polyester fiber recovered may be garnetted for reuse in either spun yarn manufacture or in nonwoven processes.

Both U.S. Pat. No. 3,937,671 and U.S. Pat. No. 3,937,675 are very expensive operations and have not been commercially successful. U.S. Pat. No. 3,937,671 requires large quantities of reactants per weight of waste material. Added expense is incurred due to the fact that the recovered materials must be dried. In the case of U.S. Pat. No. 3,937,675, high reaction temperatures and large quantities of acid are necessary. It also requires that the recovered materials must be dried.

An additional method described in the prior art for the recovery of polyester from cellulose fibers is disclosed in Democratic Republic of Germany Patent No. 1,548,043. It describes a process for obtaining polyethylene terephthalate in the form of a powder from pure starting materials or from wastes by dissolving the polyethylene terephthalate in a solvent at a temperature above the boiling point of the solvent and at a vapor pressure of the solvent corresponding to this temperature. This step is followed by cooling to precipitate the polyethylene terephthalate in the form of a powder. The solvent used is a halogenated hydrocarbon, the boiling point which is below 100 degrees Celsius at atmospheric pressure and the molecular weight of which is below 200, or a solvent mixture which contains such a halogenated hydrocarbon.

A disadvantage associated with implementation of Democratic Republic of Germany Patent No. 1,548,043 is that measures must be taken to capture the solvent vapor that is released during the process. This problem arises due to the fact that the solvent must be heated to temperatures above its boiling point.

It is an object of this invention to recover polyester fibers and cellulosic materials in useful forms from such textile waste. It is another object of this invention to provide a process for recycling polyester/cotton blends which avoids the expense associated with returning the polyester to its constituent chemicals. These and other objects of the invention will be apparent to one skilled in the art as the description thereof proceeds.

SUMMARY OF THE INVENTION

The present invention provides a process which is an effective and economical means of recycling polyester/cotton blend fabrics by separating the polyester from the cotton fabric. In particular, the present invention discloses a process for dissolving polyester with a sulfone solvent while maintaining the integrity of the cotton. The process to recycle the polyester/cotton blend fabrics includes the steps of (a) providing a polyester and cotton blend fabric; (b) charging said blend into a sulfone solvent; (c) dissolving the polyester in the sulfone solvent; (d) separating the dissolved polyester and sulfone solvent solution from the cotton fabric; (e) filtering the cotton to obtain isolated, cotton fabric.

DESCRIPTION OF THE PREFERRED EMBODIMENTS

In accordance with the present invention, sources for polyester/cotton blends may be obtained from various sources including, but not limited to, cut and sew waste from manufacturers, spinning waste from manufacturers and post consumer garments. It is noted that foreign materials should be removed from such sources, including other polymers such as nylon, and metallic objects such as zippers and buttons. It is also preferred that the fabric not be dyed although dissolution is still possible for such materials.

Once the scrap material has been accumulated, it is preferred that the scrap material be cut and chopped into small pieces for ease of handling and transfer in the appropriate vessel. One example would be one inch squares of fabric. It is important that the samples are dried beforehand in order to prevent degradation of the polyester during the process.

Preferably, the solvent system of choice is a sulfone solvent. In general sulfones are normally stable, crystalline substances of high boiling point. Certain sulfones exist as liquids while others are solids. Preferably, the sulfones used for the dissolution of the polyester are alkyl sulfones which consist of carbon chains ranging from $C_1$ to $C_{10}$. Additionally, they usually exhibit much lower toxicity than the solvents currently being used for polyester dissolution.

Preferably, the concentration of the solvent solution is based upon a 5 weight percent polyester content. For example, 380 grams of tetramethylene sulfone plus an additional 15 grams solvent for distillate collection and 40 grams of a 50/50 polyester/cotton blend fabric can be used.

After the addition of the solvent to the vessel, it is preferable to raise the temperature of the solvent to collect distillate in order to remove any impurities that might be present. The distillate includes any water that may be present in the system. At this point, it is preferable to apply a blanket of nitrogen for the remainder of the process to prevent degradation of the polyester and oxidation of the cotton.

At approximately 150 degrees Celsius the polyester/cotton fabric samples are charged into the vessel. Preferably, the samples are submerged in the solvent bath with constant agitation for about 90 minutes at 150 degrees Celsius. The purpose of this step is to thoroughly wet out the polyester/cotton fabric samples with the solvent and allow the solvent to fully penetrate all the fibers of the blend.

The temperature of the solution is raised until it reaches a temperature of about 190 degrees Celsius. The polyester/cotton fabric samples in the solvent should remain at this temperature for about 35 minutes. These are the preferred conditions at which polyester dissolves most effectively in the solvent.

The means of collecting the cotton from the dissolved polyester includes filtering, centrifuging, or belt presses. Preferably, in the present embodiment, filtering is used. The filtering may be either gravity, a vacuum type filter, or a pressure filter. Subsequent to the filtering the cotton can be washed with water to remove any residual solvent or contaminants from the cotton.

The dissolved polyester and solvent solution can be separated by various means. In the present embodiment, two possible methods can be employed. One option is the dissolved polyester can be allowed to phase out on its own with time at approximately room temperature. This is made possible due to the fact that the preferred solvent tetramethylene sulfone is a solid at room temperature. Alternatively, the dissolved polyester can be released into a coagulation solution of a second sulfone solvent and water at which time the polyester precipitates out of solution. Preferably, a 10 weight percent solvent coagulation bath heated just below the boiling point of the water is used. The solution is filtered while hot and the filtrate is filtered repeatedly.

EXAMPLE

The experiments were conducted in a standard 1.5 Liter autoclave vessel. It was equipped with a condenser to collect distillate, a means of discharge at the bottom of the vessel, and access inlets for when the system is under vacuum or under a nitrogen atmosphere. The concentration of the solution was based upon a 5 weight percent polyester content. Therefore, 380 g of tetramethylene sulfone plus an additional 15 g and 40 g of polyester/cotton were used. The fabric sample was an off-white knit, and the assumption was precisely 50/50 polyester/cotton by weight. The fabric samples were dried overnight in a vacuum oven at 100 degrees Celsius at a pressure below 1 mm Hg. It was important that the samples were dried beforehand in order to prevent degradation of the polyester during the process.

After the addition of the tetramethylene sulfone to the autoclave, a nitrogen purge was started and continued for about 15 minutes at room temperature prior to heating. During the purge a stirrer provided agitation at a moderate speed to the tetramethylene sulfone bath. Once this was completed, the temperature was raised to 130 degrees Celsius while the system was under full vacuum. The intention was to collect about 15 g of distillate in order to remove any impurities that might have been present. The distillate included any water present in the system. It needed to be removed or the polyester would have a lowered IV. Once the distillate was collected the vacuum was removed.

A blanket of nitrogen was then applied for the remainder of the experiment. At approximately 150 degrees Celsius the polyester/cotton samples were charged into the vessel. The samples were submerged in the solvent bath with constant agitation for about 90 minutes at 150 degrees Celsius. The purpose of this step was to thoroughly wet out the polyester/cotton samples with the solvent to fully penetrate all the fibers of the blend. The temperature was raised until it reached 190 degrees Celsius. The polyester/cotton in solvent remained at this temperature for 35 minutes. This is the lowest temperature at which polyester dissolves most effectively in the solvent. Dissolution occurred rather rapidly, and analytical evaluation verified that all the polyester was dissolved from the blend at this time and temperature.

After the 35 minutes was reached, the cap was removed from the outlet at the bottom of the autoclave. The tubing connector that was capped had an approximate diameter of 0.094 in. The thin stream of solution flowed into a Waring commercial blender of about 1 gallon capacity. The blender was on medium speed and contained a tetramethylene sulfone/water coagulation solution. The tetramethylene sulfone/water solution was 1000 g in total and was composed of 100 g tetramethylene sulfone and 900 g water heated just below the boiling point of the water. When the dissolved polyester solution reached the coagulation bath, the polyester precipitated out of solution. The solution was filtered while hot, and the filtrate was filtered repeatedly. The cotton samples were contained within the autoclave. The collected cotton was soaked and rinsed in near boiling water to remove any dissolved polyester or solvent. This washing step was repeated at least six times. The collected washings were then vacuum filtered in order to collect all the dissolved polyester.

The filter cake and the cotton samples were dried in the vacuum oven. When the experiment was conducted under nitrogen the precipitated recovered polyester was white in color. However, without the nitrogen the recovered polyester was light brown in color. The cotton was less discolored when under nitrogen also.

Thus, it is apparent that there has been provided in accordance with the invention a method of recycling polyester/cotton blend fabrics whereby the polyester component would be dissolved such that both components of the blend could be recovered and recycled. While the invention has been described in conjunction with the specific embodiments thereof, it is evident that many alternatives, modifications and variations will be apparent to those skilled in the art in light of the foregoing description. Accordingly, it is intended to embrace all such alternatives, modifications that fall within this sphere and scope of the invention.

That which is claimed is:

1. A process for recycling polyester and cotton blend fabrics comprising the steps of:
   providing a polyester and cotton blend fabric;
   charging said blend in a sulfone solvent;
   dissolving the polyester in said sulfone solvent;
   separating the dissolved polyester and sulfone solvent solution from the cotton fabric;
   allowing the dissolved polyester solution to phase out on its own with time;
   filtering the cotton fabric as to obtain the isolated, cotton fabric.

2. The process according to claim 1 wherein said sulfone solvent is an alkyl sulfone.

3. The process according to claim 2 wherein said alkyl sulfone was tetramethylene sulfone.

4. The process according to claim 3 wherein said solvent was 99% pure.

5. The process according to claim 2 wherein said alkyl sulfone includes methylethyl sulfone, methyl propyl sulfone, dimethyl sulfone, and diethyl sulfone.

6. The process according to claim 1 where the fabric samples were dried at an appropriate temperature, pressure, and time interval as to prevent degradation of the polyester during the process.

7. The process according to claim 1 where constant agitation is provided during both the saturation and dissolution steps.

8. The process according to claim 1 wherein the dissolving step is carried out at a temperature of about 190 degrees Celsius for a period of less than about 35 minutes.

9. A process for recycling polyester and cotton blend fabrics comprising the steps of:
   providing a polyester and cotton blend fabric;
   charging said blend in a first sulfone solvent;
   dissolving the polyester in said first sulfone solvent;
   separating the dissolved polyester and first sulfone solvent solution from the cotton fabric;
   releasing the dissolved polyester into a coagulation solution of second sulfone solvent and water at which time the polyester precipitates out of solution;
   separating the dissolved polyester from the solution of a second sulfone solvent and water;
   filtering the cotton fabric as to obtain isolated, cotton fabric.

10. The process according to claim 9 wherein said sulfone solvent is an alkyl sulfone.

11. The process according to claim 10 wherein said alkyl sulfone was tetramethylene sulfone.

12. The process according to claim 11 wherein said solvent was 99% pure.

13. The process according to claim 10 wherein said alkyl sulfone includes methylethyl sulfone, methyl propyl sulfone, dimethyl sulfone, and diethyl sulfone.

14. The process according to claim 9 where the second sulfone solvent may be either methylethyl sulfone, methyl propyl sulfone, dimethyl sulfone, diethyl sulfone, or tetramethylene sulfone.

15. The process according to claim 14 wherein said second sulfone solvent was tetramethylene sulfone.

16. The process according to claim 9 wherein the coagulation bath of said second sulfone solvent and water is heated to about the boiling temperature of water.

17. The process according to claim 9 wherein constant agitation is provided in the coagulation bath.

18. The process according to claim 9 where the fabric samples were dried at an appropriate temperature, pressure, and time interval as to prevent degradation of the polyester during the process.

19. The process according to claim 9 wherein constant agitation is provided during both the saturation and dissolution steps.

20. The process according to claim 9 wherein the dissolving step is carried out at a temperature of about 190 degrees Celsius for a period of less than about 35 minutes.

* * * * *